United States Patent Office 3,075,989
Patented Jan. 29, 1963

3,075,989
PRODUCTION OF ACETYL-SUBSTITUTED PYRIDINES
George William Godin, London, and Archibald Robert Graham, Epsom, England, assignors to The Distillers Company Limited, Edinburgh, Scotland, a British company
No Drawing. Filed Apr. 20, 1961, Ser. No. 104,257
Claims priority, application Great Britain Mar. 14, 1958
12 Claims. (Cl. 260—297)

This is a continuation-in-part of our prior application Serial No. 794,829, now abandoned.

The present invention relates to the production of 2-methyl-5-ethyl pyridine.

It is well known in the art to oxidize alkyl side chains of heteroaromatic compounds containing aliphatic substituents. Such oxidation may be carried out with the aid of catalysts and leads to the formation of heteroaromatic carboxylic acids such as nicotinic acid or isonicotinic acid. It is also known to chlorinate oxidizingly the ethyl side chain of 5-ethyl-pyridines, whereby trichloroacetyl pyridinium-chloride salts are formed.

However, it was hitherto not known how to steer the oxidation of the aforesaid heteroaromatic compounds, without simultaneous chlorination, in such a manner that there are obtained satisfactory yields of compounds in which only the carbon atom of the side chain, which is linked directly to a carbon atom of the heteroaromatic ring, is oxidised to a

group while the remaining carbon atoms of the side chain remain unaffected by the oxidizing treatment.

We have now found that this can be achieved, according to the process of our present invention, by heating 2-methyl-5-ethyl pyridine in the liquid phase, and in the presence of a reaction-steering catalytically active organic peroxide, at a temperature of from about 50° to 250° C., while stirring a stream of molecular oxygen into the mixture of starting compound and initiator.

The process of the invention is illustrated by the equation:

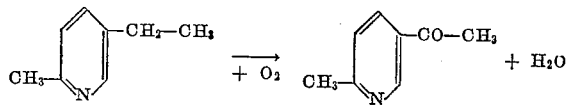

The 2-methyl-5-ethyl pyridine is heated in the liquid phase and in the presence of an organic peroxide catalyst with molecular oxygen, at a temperature in the range from 50° to 250° C., a temperature in the range from 60° to 200° C. being particularly preferred. Oxygen, air or a mixture of oxygen and air may be used as the molecular oxygen.

In this specification the term "peroxide" is used to include hydroperoxides.

The heating of the 2-methyl-5-ethyl pyridine in the liquid phase with molecular oxygen is carried out in batch-wise or in a continuous manner. The oxidation is preferably carried out by stirring the starting material containing the peroxide catalyst in molecular oxygen containing atmosphere in the absence of any solvent, but the reaction can be carried out in a solvent, such as cumene, which is itself capable of being oxidised to a hydroperoxide (in which case the addition of a peroxide catalyst is unnecessary), and passing molecular oxygen into the stirred solution. Such solvents are alkyl substituted benzenes in which the carbon atom adjacent to the benzene nucleus carries at least one hydrogen atom. Solvents of this type include cumene, ethylbenzene, di-isopropylbenzene, and tetrahydronaphthalene. Alternatively the reaction may be carried out in an inert solvent such as benzene, chlorobenzene or t-butylbenzene.

The catalysts which are used in the process of the present invention are organic peroxides, i.e. compounds consisting essentially of the formula ROOR₁ or ROOH where R and $R_1$ are each lower alkyl, mononuclear aralkyl, hydroxy-alkyl or acyl radicals. As examples of this class of compound may be mentioned diacyl peroxides, such as di-benzoyl peroxide; dialkyl peroxides, such as di-tertiary-butyl peroxide; monoalkylhydroperoxides, such as t-butyl hydroperoxide; aralkyl peroxides, such as di-α-cumyl peroxide; aralkyl hydroperoxides, such as cumene hydroperoxide, ethylbenzene hydroperoxide, di-isopropylbenzene hydroperoxide; aldehyde peroxides, such as hydroxy-heptyl peroxide; ketone peroxides, such as 1-hydroxy cyclohexyl peroxide; alkylperesters such as t-butyl perbenzoate; and alkylperacids such as t-butyl perphthalic acid. Tetrahydronaphthalene hydroperoxide is also a suitable catalyst and may be clased as an aralkyl hydroperoxide. If an oxidizable solvent, such as cumene, which readily forms a hydroperoxide is present, this solvent itself provides the initiator and further catalysts need not be added. When using di-α-cumyl peroxide or di-tertiary butyl peroxide as catalyst, best results are obtained at reaction temperatures of 120° to 140° C.

2-methyl-5-acetyl-pyridine produced by the process of the present invention is a valuable intermediate in the preparation of methyl-vinyl pyridine which itself is a starting material for commercially valuable polymers and copolymers.

In the following examples, which are given to illustrate further the present invention, parts by weight shown therein bear the same relation to parts by volume as do kilograms to liters. Percentages are given by weight.

Example 1

50 parts by weight of 2-methyl-5-ethyl pyridine containing 0.5% di-α-cumyl peroxide as initiator were heated to 140° C. and oxidised with oxygen by passing a stream of the latter gas through the liquid while stirring the same. Oxidation readily took place. After 2 hours, a further 0.25 part by weight of the initiator was added and after 1.5 hours, a second addition of 0.25 part by weight of the initiator was made and the oxidation was continued for another 1.5 hours.

The resulting product contained 20% of 2-methyl-5-acetyl pyridine which was separated from the product by fractionated distillation under a reduced pressure of 13 torr (mm. Hg). A small proportion of hydroperoxide was found to be formed transiently during the first 15 minutes of oxidation.

Example 2

50 parts by weight of 2-methyl-5-ethyl pyridine containing 5% di-α-cumyl peroxide as initiator were heated to 120° C. and stirred while a stream of oxygen was passed in.

The oxidation was continued for 23 hours, during which time oxygen equivalent to 0.35 molar proportions per molar proportion of 2-methyl-5-ethyl pyridine had been absorbed. The resulting reaction product contained 35 to 40% of 2-methyl-5-acetyl pyridine as determined by infra-red analysis. The acetyl-pyridine was separated from the reaction product as described in Example 1.

Example 3

50 parts by weight of 2-methyl-5-ethyl pyridine containing 5% di-tertiary-butyl peroxide as initiator were heated at 120° C. and stirred while a stream of oxygen was passed in.

At 23 hours and again at 28½ hours from the start of the oxidation, 5% of the initiator was added to the stirred mixture. The oxidation was terminated after 45¼ hours, when 0.35 molar proportions of oxygen had been absorbed per molar proportion of 2-methyl-5-ethyl pyridine. The product was found to contain 35 to 40% 2-methyl-5-acetyl pyridine by infra-red analysis. The acetyl-pyridine was isolated as described in Example 1.

*Example 4*

50 parts by weight of 2-methyl-5-ethyl pyridine and 2.5 parts by weight of cumene were heated to 140° C. and stirred while a stream of oxygen was pasesd in. After 23¼ hours, the amount of oxygen absorbed was 0.22 molar proportions per molar proportion of 2-methyl-5-ethyl pyridine. The product contained 15% 2-methyl-5-acetyl pyridine determined by infra-red analysis, which acetyl-pyridine was isolated as described in Example 1.

*Example 5*

Example 1 is repeated using, however, 3% of di-benzoyl peroxide as the catalyst. Similar results to those of Example 1 are obtained.

*Example 6*

The process of Example 1 is repeated except that 1% of t-butyl hydroperoxide is used as the catalyst. A similar result to Example 1 is obtained.

*Example 7*

Example 1 is repeated using, however, 0.5% of cumene hydroperoxide as catalyst. The result is similar to that of Example 1.

*Example 8*

The process of Example 1 is repeated using 1% of hydroxyheptyl peroxide as catalyst. Similar results as in Example 1 are obtained.

*Example 9*

Example 1 is repeated using, however, 1.5% of 1-hydroxycyclohexyl peroxide as catalyst. The result is similar to that of Example 1.

*Example 10*

The process of Example 1 is repeated using 0.5% of t-butyl perbenzoate as catalyst. A similar result to that of Example 1 is obtained.

*Example 11*

The process of Example 1 is repeated using 1.5% of t-butyl perphthalic acid as catalyst. Similar results as in Example 1 are obtained.

*Example 12*

Example 1 is repeated using 1% of tetrahydro-naphthalene hydroperoxide as catalyst. A similar result to that of Example 1 is obtained.

*Example 13*

50 parts by weight of 2-methyl-5-ethyl pyridine, 1 part of cumene hydroperoxide and 25 parts of cumene are heated to 140° C., and stirred while a stream of oxygen is passed in. The reaction is allowed to proceed for 24 hours after which the product is analysed for 2-methyl-5-acetyl pyridine by infra-red analysis, and treated for the recovery of the acetyl pyridine as described in Example 1. A similar result to that of Example 4 is obtained.

*Example 14*

50 parts by weight of 2-methyl-5-ethyl pyridine, 50 parts by weight of benzene and 5 parts by weight of di-α-cumyl peroxide as initiator are heated to 140° C. and oxidised with oxygen by passing a stream of the gas through the mixture with stirring. After a period of 23 hours the reaction product is analysed for 2-methyl-5-acetyl pyridine by infra-red analysis. A similar result to Example 2 is obtained.

We claim:

1. A process for producing 2-methyl-5-acetyl pyridine, consisting essentially of heating in the liquid phase, at a temperature of from about 50° to 250° C. 2-methyl-5-ethyl pyridine in the presence, in the pyridine, of an organic peroxide catalyst, and stirring a stream of molecular oxygen into the mixture.

2. A process for producing 2-methyl-5-acetyl pyridine, consisting essentially of heating in the liquid phase, at a temperature of from about 50° to 250° C. 2-methyl-5-ethyl pyridine in the presence, in the pyridine, of an organic peroxide catalyst, in a solvent which is oxidised under the conditions of the reaction to a hydroperoxide, and stirring a stream of molecular oxygen into the mixture.

3. A process for producing 2-methyl-5-acetyl pyridine, consisting essentially of heating in the liquid phase, at a temperature of from about 50° to 250° C. 2-methyl-5-ethyl pyridine in a solvent which is oxidised under the conditions of the reaction to a hydroperoxide and stirring a stream of molecular oxygen into the mixture.

4. A process for producing 2-methyl-5-acetyl pyridine, consisting essentially of heating in the liquid phase, at a temperature of from about 50° to 250° C. 2-methyl-5-ethyl pyridine in a solvent selected from the group consisting of cumene, ethyl-benzene, diisopropylbenzene and tetrahydronaphthalene and stirring a stream of molecular oxygen into the mixture.

5. A process for producing 2-methyl-5-acetyl pyridine, consisting essentially of heating in the liquid phase, at a temperature of from about 50° to 250° C. 2-methyl-5-ethyl pyridine in the presence, in the pyridine, of an organic peroxide catalyst in an inert solvent, and stirring a stream of molecular oxygen into the mixture.

6. A process for producing 2-methyl-5-acetyl pyridine, consisting essentially of heating in the liquid phase, at a temperature of from about 50° to 250° C. 2-methyl-5-ethyl pyridine in the presence, in the pyridine, of an organic peroxide catalyst in an inert solvent selected from the group consisting of benzene, chlorobenzene and t-butylbenzene, and stirring a stream of molecular oxygen into the mixture.

7. A process for producing 2-methyl-5-acetyl pyridine, consisting essentially of heating in the liquid phase, at a temperature of from about 50° to 250° C. 2-methyl-5-ethyl pyridine in the presence, in the pyridine, of an organic peroxide catalyst of the formula

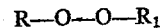

wherein R is a member selected from the group consisting of lower alkyl, mononuclear aralkyl, hydroxyalkyl and acyl, $R_1$ is a member selected from the group consisting of hydrogen, lower alkyl, mononuclear aralkyl, hydroxyalkyl and acyl; and stirring a stream of molecular oxygen into the mixture.

8. A process for producing 2-methyl-5-acetyl pyridine, consisting essentially of heating in the liquid phase, at a temperature of from about 50° to 250° C. 2-methyl-5-ethyl pyridine in the presence, in the pyridine, of di-tertiary-butyl peroxide, and stirring a stream of molecular oxygen into the mixture.

9. A process for producing 2-methyl-5-acetyl pyridine, consisting essentially of heating in the liquid phase, at a temperature of from about 50° to 250° C. 2-methyl-5-ethyl pyridine in the presence, in the pyridine, of di-α-cumyl peroxide, and stirring a stream of molecular oxygen into the mixture.

10. A process for producing 2-methyl-5-acetyl pyridine, consisting essentially of heating in the liquid phase, at a temperature of from about 50° to 250° C. 2-methyl-5-ethyl pyridine in the presence, in the pyridine, of cumene hydroperoxide, and stirring a stream of molecular oxygen into the mixture.

11. A process for producing acetylated pyridine, comprising heating in the liquid phase, 2-methyl-5-ethyl pyridine in the presence of di-α-cumyl peroxide to about 120° to 140° C. and stirring a stream of oxygen into the heated liquid for about 5 to 23 hours, whereby the corresponding 5-acetyl pyridine is obtained.

12. A process for producing C-acetyl substituted nitrogen-containing heterocyclic compounds, consisting essentially of heating in the liquid phase, 2-methyl-5-ethyl pyridine dissolved in cumene at a temperature of from about 50° to 250° C. and stirring a stream of molecular oxygen thereinto.

References Cited in the file of this patent
UNITED STATES PATENTS

| | | |
|---|---|---|
| 2,437,938 | Cislak et al. | Mar. 16, 1948 |
| 2,670,352 | Fand et al. | Feb. 23, 1954 |